Patented Feb. 29, 1944

2,343,136

UNITED STATES PATENT OFFICE 2,343,136

WELL COMPLETION FLUID

William M. Dobson and Albert L. Frye, Long Beach, and Alfred Paul Lentz, Maywood, Calif., assignors to Richfield Oil Corporation, Los Angeles, Calif., a corporation of New Jersey No Drawing. Application August 2, 1941
Serial No. 405,212

15 Claims. (Cl. 252—8.55)

This invention relates to well treating fluids and more particularly to a fluid capable of removing an emulsified asphalt-hydrated clay sheath from the walls of a bore hole.

In the drilling of oil wells a sheath is deposited on the walls of the bore hole formed of suspended particles of the drilling fluid. The excess of pressure of the hydrostatic head of the drilling fluid over the pressure of the formation fluids forces the liquid of the drilling fluid into the formations leaving the solid particles on the face. It has recently been proposed to employ a drilling fluid comprising an emulsified asphalt-clay base. When this type of drilling fluid is employed the resulting sheath is so compact and plastic that it is difficult to remove it so that the well can be brought into production in the normal manner.

Heretofore after the drilling of a well and the installation of the producing equipment the well has been brought into production by swabbing, that is by lowering the fluid level in the well bore to a point where the formation pressure of the formation fluids exceeds the hydrostatic pressure of the fluid in the well bore and the pressure necessary to rupture the sheath of solid particles. It has also been proposed to disintegrate this sheath by chemical treatment, such as the use of inhibited hydrochloric acid.

A sheath composed of a mixture of emulsified asphalt-hydrated clay particles is, however, so tough and compact that ordinary swabbing will not create sufficient pressure differential to cause the formation fluids to rupture it and permit the well to flow. While such a sheath may be disintegrated by chemical treatment, such as inhibited hydrochloric acid, this treatment produces aqueous solutions carrying materials in suspension and solution which react with the formation fluids to form gelatinous and curdy flocs and precipitates which tend to plug the formation.

To successfully remove an emulsified asphalt-hydrated clay sheath from the face of a well bore, it is necessary to provide a treating fluid that is miscible with crude oil, will simultaneously attack the emulsifying and stabilizing materials used in the production of the asphalt-clay emulsion, which will dissolve the asphalt, and which will disintegrate the hydrated clay. It is also necessary that the treating fluid have a specific gravity high enough to enable it to displace the well fluids and remain opposite the portion of the sheath to be attacked. In the present invention we provide a treating fluid that will successfully remove a sheath formed of emulsified asphalt-hydrated clay particles from the face of the well bore. In carrying out the invention we provide a treating fluid which has the ability to attack all of the ingredients of the emulsified asphalt-hydrated clay sheath simultaneously. It is also miscible in all proportions with crude oil thereby avoiding the possibility of forming a "water block." It is of such specific gravity that it will remain opposite the portion of the sheath to be attacked. In forming the treating fluid, we provide an enzyme which is capable of attacking the emulsifying and stabilizing agents used in the asphalt, clay sheath, such as casein. An enzyme that may be employed for this purpose is papain. We also employ a mixture of sulfated and sulfonated derivatives of hydrocarbons or a coupling agent. Thus we may employ amines or amides of the fatty acids, such as oleic amine dissolved in light hydrocarbon fractions of petroleum, aromatic solvents of the benzene, toluene series, an alcohol, such as methyl alcohol, ethyl alcohol, etc., or a ketone, such as acetone, methyl ethyl ketone, etc., or in place of a coupling material of this sort we may employ an emulsifying material, such as an acid sludge derived from the treatment of a light petroleum hydrocarbon with sulfuric acid. In some instances we may employ an alcohol or a ketone as a coupling agent although better results are usually obtained when either a sulfated hydrocarbon or a fatty acid amine or amide is employed. While the amines or amides of the saturated fatty acids may be employed, they are more difficult to dissolve and to hold in solution in the mixture. In the specific examples given we have therefore employed amines of the unsaturated fatty acids and we find them to be preferable to the amines or amides of the saturated fatty acids.

The treating fluid further comprises an organic acid of the acetic acid series, such as acetic acid, propionic acid, etc., a chlorinated or brominated hydrocarbon including the mono, di, tri, tetra and hexa chlorides and bromides of the paraffin, olefin and acetylene series, and water. The following formulae are given by way of example:

A.

| | Parts |
|---|---|
| Gas oil | 350 |
| Glacial acetic acid | 45 |
| Trichloroethylene | 104 |
| Water | 16 |
| Oleic amine | 2.5 |
| Benzene | 100 |
| Papain | 1.0 |

B

| | Parts |
|---|---|
| Benzene | 225 |
| Glacial acetic acid | 45 |
| Trichloroethylene | 100 |
| Methanol | 175 |
| Water | 15 |
| Papain | 2 |

C

| | Parts |
|---|---|
| Toluene | 225 |
| Glacial acetic acid | 45 |
| Trichloroethylene | 100 |
| Methanol | 130 |
| Oleic amine | 2.5 |
| Water | 10 |
| Papain | 3 |

D

| | Parts |
|---|---|
| An acid sludge derived from the treatment of a light petroleum hydrocarbon with concentrated sulfuric acid. This sludge is washed with water and substantially all of the mineral acid is removed by said water washing | 280 |
| Glacial acetic acid | 35 |
| Water | 70 |
| Trichloroethylene | 36 |
| Papain | 1.7 |
| Isopropyl alcohol | 100 |

In preparing a mixture of the type shown in Example D wherein an acid sludge is used, the glacial acetic acid is dissolved in the acid sludge and the papain is dissolved in the chlorinated hydrocarbon. These two mixtures are then brought together with agitation and the desired amount of water is added with agitation, and the isopropyl alcohol is then added to the mixture to form a water-in-oil emulsion. In preparing mixtures of the types designated in the other examples using a coupling agent, such as an amine or alcohol, the papain is first suspended in the trichloroethylene, the acetic acid and water are then mixed and combined with the suspended papain, and this composite is then added, with agitation, to the emulsifying or coupling agent previously dissolved in a solvent such as gas oil or other hydrocarbon fraction, benzene or toluene, methyl alcohol, or other appropriate alcohol, acetone, methyl ethyl ketone or the like to produce a water-in-oil emulsion.

The treating fluid thus formed is a stable, water-in-oil emulsion which will not separate when exposed to the sheath or to the well fluids. Its specific gravity is such that it will remain opposite the portion of the sheath to be attacked and it may be placed in the well in any of the well known ways. While in the well it simultaneously attacks the emulsifying and stabilizing agents of the emulsified asphalt-hydrated clay, such as casein, dissolves the asphalt and disintegrates the hydrated clay particles. At the same time it forms stable liquid emulsions with the formation fluids so that it can be easily removed from the well bore. It is also non-corrosive to the metal equipment in the well.

Throughout the claims the phrase "emulsifying material" is used to designate either a mixture of sulfated or sulfonated derivatives of hydrocarbons, or a coupling agent, such as an amine of a fatty acid dissolved in either light hydrocarbon fractions of petroleum, aromatic solvents of the benzene toluene series, phenol and its homologs, alcohols and ketones, or an alcohol or a ketone. The term "chloronated hydrocarbons" is employed to designate the chlorides and bromides of the paraffin, olefin and acetylene series. As it is often questionable whether a commercial fatty acid "amine" is an amine or an amide, the materials actually employed in forming the treating fluid may be amides and the term "an amine of a fatty acid" employed in the claims is intended to designate either an amine or an amide of a fatty acid.

In the specific examples given we have designated papain as the enzyme to be used to attack the casein or other protein stabilizing agent in the sheath. Any other proteolytic enzyme that is capable of attacking casein or other materials used as the stabilizing agent of the emulsifying asphalt may be employed. As an example pepsin may be used in place of papain in many instances.

Phenol and its homologs are distinct aids to emulsification and emulsion stability when used in small amounts. From 0.01 to 5 percent of phenol or one of its homologs may be added to any of the formulae given. Their use, however, is not essential but is of advantage as set forth.

We claim:

1. A well treating fluid for disintegrating emulsified asphalt-hydrated clay sheaths containing casein as a stabilizing agent comprising a proteolytic enzyme, a coupling agent, a lower member of the fatty acid series, and volatile solvents selected from the group consisting of the mono, di, tri, tetra, and hexa chlorides and bromides of the paraffin, olefine and acetylene series, and water.

2. A well treating fluid for disintegrating emulsified asphalt-hydrated clay sheaths containing casein as a stabilizing agent comprising a proteolytic enzyme, a sulphated derivative of a hydrocarbon, a lower member of the fatty acid series, and volatile solvents selected from the group consisting of the mono, di, tri, tetra, and hexa chlorides and bromides of the paraffin, olefine and acetylene series, and water.

3. A well treating fluid for disintegrating emulsified asphalt-hydrated clay sheaths containing casein as a stabilizing agent comprising papain, a coupling agent, a lower member of the fatty acid series, and volatile solvents selected from the group consisting of the mono, di, tri, tetra, and hexa chlorides and bromides of the paraffin, olefine and acetylene series, and water.

4. A well treating fluid for disintegrating emulsified asphalt-hydrated clay sheaths containing casein as a stabilizing agent comprising papain, a sulphated derivative of a hydrocarbon, a lower member of the fatty acid series, and volatile solvents selected from the group consisting of the mono, di, tri, tetra, and hexa chlorides and bromides of the paraffin, olefine and acetylene series, and water.

5. A well treating fluid for disintegrating emulsified asphalt-hydrated clay sheaths containing casein as a stabilizing agent comprising papain, a coupling agent, glacial acetic acid, volatile solvents selected from the group consisting of the mono, di, tri, tetra, and hexa chlorides and bromides of the paraffin, olefine and acetylene series, and water.

6. A well treating fluid for disintegrating emulsified asphalt-hydrated clay sheaths containing casein as a stabilizing agent, comprising papain, a coupling agent, a lower member of the fatty acid series, trichloroethylene, and water.

7. A well treating fluid for disintegrating emulsified asphalt-hydrated clay sheaths containing casein as a stabilizing agent comprising a proteolytic enzyme, a coupling agent selected from the group consisting of amines containing a long chain alkyl radical and amides of higher fatty acids, a lower member of the fatty acid series, volatile solvents from the group consisting of the mono, di, tri, tetra, and hexa chlorides and bromides of the paraffin, olefine and acetylene series, and water.

8. A well treating fluid for disintegrating emulsified asphalt-hydrated clay sheaths containing casein as a stabilizing agent comprising papain, a coupling agent selected from the group consisting of amines containing a long chain alkyl radical and amides of higher fatty acids, a lower member of the fatty acid series, volatile solvents from the group consisting of the mono, di, tri, tetra, and hexa chlorides and bromides of the paraffin, olefine and acetylene series, and water.

9. A well treating fluid for disintegrating emulsified asphalt-hydrated clay sheaths containing casein as a stabilizing agent comprising a proteolytic enzyme, a coupling agent selected from the group consisting of amines containing a long chain alkyl radical and amides of higher fatty acids, glacial acetic acid, volatile solvents from the group consisting of the mono, di, tri, tetra and hexa chlorides and bromides of the paraffin, olefine and acetylene series, and water.

10. A well treating fluid for disintegrating emulsified asphalt-hydrated clay sheaths containing casein as a stabilizing agent comprising a proteolytic enzyme, a coupling agent selected from the group consisting of amines containing a long chain alkyl radical and amides of higher fatty acids, a lower member of the fatty acid series, trichloroethylene, and water.

11. A well treating fluid for disintegrating emulsified asphalt-hydrated clay sheaths containing casein as a stabilizing agent comprising papain, oleyl amine, a solvent therefor, glacial acetic acid, trichloroethylene, and water.

12. A well treating fluid for disintegrating emulsified asphalt-hydrated clay sheaths containing casein as a stabilizing agent comprising papain, oleyl amine, methanol toluene, glacial acetic acid, trichloroethylene, and water.

13. A well treating fluid for disintegrating emulsified asphalt-hydrated clay sheaths containing casein as a stabilizing agent comprising papain, an acid sludge derived from the treatment of a light petroleum hydrocarbon with a mineral acid, a glacial acetic acid, trichloroethylene, and water.

14. A well treating fluid for disintegrating emulsified asphalt-hydrated clay sheaths containing casein as a stabilizing agent comprising a proteolytic enzyme, a lower member of the fatty acid series, volatile solvents selected from the group consisting of the mono, di, tri, tetra, and hexa chlorides and bromides of the paraffin, olefine, and acetylene series, water, and an agent to stabilize the fluid against separation of its constituents.

15. A well treating fluid for disintegrating emulsified asphalt-hydrated clay sheaths containing casein as a stabilizing agent comprising papain, a lower member of the fatty acid series, volatile solvents selected from the group consisting of the mono, di, tri, tetra, and hexa chlorides and bromides of the paraffin, olefine, and acetylene series, water, and an agent to stabilize the fluid against separation of its constituents.

WILLIAM M. DOBSON.
ALBERT L. FRYE.
ALFRED PAUL LENTZ.